Nov. 25, 1924.
W. M. HOLLOWELL
1,517,065
BABBITTING JIG
Filed July 11, 1923
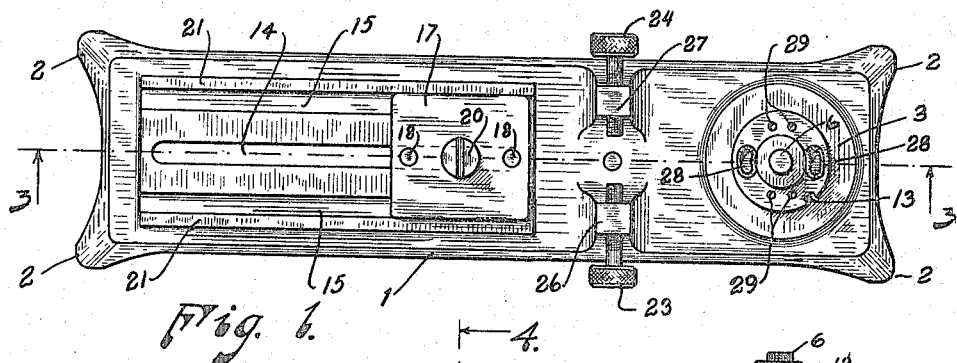
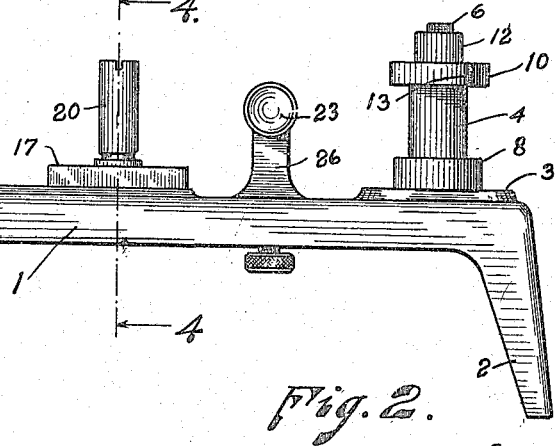
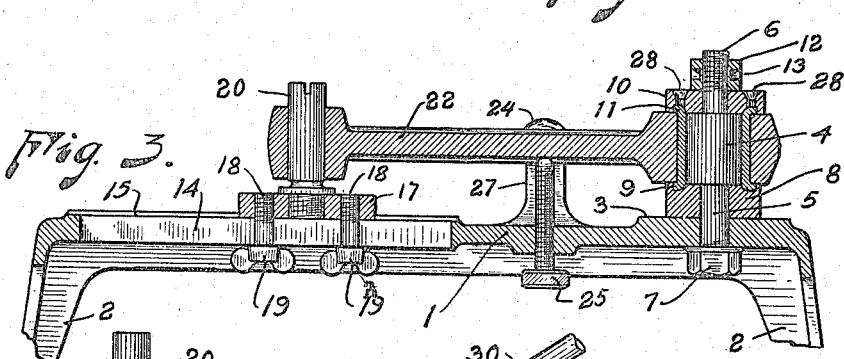
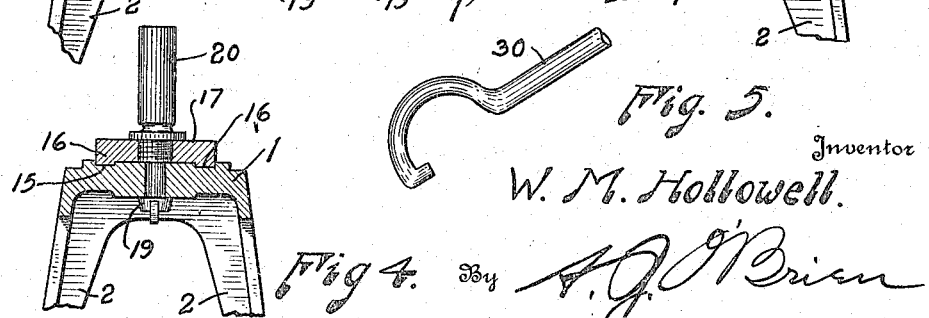
Inventor
W. M. Hollowell.
By A. J. O'Brien
Attorney Patented Nov. 25, 1924.

1,517,065

UNITED STATES PATENT OFFICE.

WILLIAM M. HOLLOWELL, OF ARMEL, COLORADO.

BABBITTING JIG.

Application filed July 11, 1923. Serial No. 650,793.

*To all whom it may concern:*

Be it known that I, WILLIAM M. HOLLOWELL, a citizen of the United States, residing at Armel, county of Yuma, and State of Colorado, have invented certain new and useful Improvements in Babbitting Jigs; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a babbitting jig designed for use in connection with the rebabbitting of the bearings in connecting rods of the type employed in connection with internal combustion engines.

It is the present practice in automotive engineering to line the bearings or boxes of the steel connecting rods with some anti-friction material, such as babbitt. The babbitt, being softer than the steel crank shaft with which it cooperates, wears much faster than the shaft and after some time the bearing will become worn to such an extent that it can no longer be used. When the babbitt boxes or liners have become worn out, they must be removed and replaced by new ones.

In order to properly rebabbitt a connecting rod bearing, great care must be exercised. In the first place, the axis of the bearing that cooperates with the crank pin must be parallel to the axis of the wrist pin. In the second place, the centers of the wrist pin and the crank pin bearing must be spaced a certain distance apart for the reason that if this distance is made different from that for which the engine was designed, the clearance of the engine and, consequently, the operation thereof, is changed, and besides these two very important particulars, there are other points of minor importance that must be taken car of when a connecting rod is rebabbitted.

It is the object of this invention to produce an apparatus of the type referred to which shall be so constructed that it can be readily adjusted to fit any ordinary connecting rod, and which shall be provided with means for adjusting the position of the rod in both a horizontal and vertical direction.

The above and other objects, which will become readily apparent as the description proceeds, are attained by means of a construction which I will now describe in detail, reference for this purpose being had to the accompanying drawing in which the preferred embodiment of my invention is shown, and in which:

Fig. 1 is a top plan view of my device.

Fig. 2 is a side elevation of the device shown in Fig. 1.

Fig. 3 is a longitudinal section taken on line 3—3, Fig. 1, the connecting rod being shown in place.

Fig. 4 is a vertical section taken on line 4—4, Fig. 2, and

Fig. 5 is a plan view of a portion of the spanner wrench employed in connection with my device.

The same reference numerals will be employed to designate the same or similar parts throughout the several views.

Numeral 1 represents the bed plate of my apparatus which is of a rectangular shape and provided at each corner with a leg 2. The bed plate 1 has a slightly raised surface 3 near one end thereof and has secured thereto a mandrel 4 whose central portion is cylindrical and of the same diameter as the crank pin with which the connecting rod is to cooperate. At each end of the central portion and in axial alignment therewith are cylindrical portions 5 and 6 whose purpose and function are obvious from an inspection of Fig. 3, but which will, however, be hereinafter described. The raised portion 3, which is preferably circular, as shown in Fig. 1, has a central opening for the reception of the bolt 5 whose lower end is threaded for the reception of the nut 7. A collar 8 whose upper surface is provided with a groove 9, has its lower surface resting against the top of the raised part 3 and has a central opening for the reception of the bolt 5, by means of which it and the mandrel 4 is secured to the bed plate. A collar 10 provided on its lower surface with a circular groove 11, has a central opening adapted to receive the bolt 6 whose upper end is threaded and provided with a clamping nut 12, by means of which the collar 10 is held in place. The nut 12 may be round, as shown in the drawing, and provided with one or more holes 13 for cooperating with the lug of a spanner, or the nut may be hexagonal. A slot 14 extends lengthwise of the bed plate, in such a direction that its axis intersects the axis of the mandrel 4. The upper surface of the bed plate is machined and is provided with two parallel grooves 15 which serve as guides for the parallel downwardly projecting portions 16 of the slide 17. This slide has two threaded openings, each of which is adapted to receive a clamping screw 18. The clamping screws are provided with heads 19 formed in the shape of a wing nut so that they may be tightened and loosened without the aid of a wrench. If desired, the clamping screws may be welded or otherwise secured to the slide 17 and provided with wing nuts, as either way is satisfactory. A stud or mandrel 20 is secured to the slide 17, in the manner shown in Fig. 3. This stud is adapted to enter the opening in the connecting rod which is normally occupied by the wrist pin. It is evident that the slide 17 can be moved along the slot 14 to any desired position and clamped in place by screws 18.

When it is desired to rebabbitt a connecting rod bearing, the stud 20 and the mandrel 4 are selected of the proper diameter to correspond with the diameter of the wrist pin and the crank pin respectively. The distance between the centers of the mandrels 4 and 20 is then accurately adjusted to the length required for the particular connecting rod. In order to facilitate the adjustment, a scale may be provided on the upper surface of one of the ribs 21 and a mark on the side of the slide 17. Even a vernier may be provided. This has not been shown as it is old in micrometer calipers and analogous measuring instruments. The connecting rod shown in section in Fig. 3 and indicated by numeral 22, is then put into place on the mandrels. In order to center the connecting rod bearing with respect to the mandrel 4 and for holding the same level, I have provided three adjusting screws 23, 24 and 25. Screws 23 and 24 pass through threaded openings in the top of lugs 26 and 27, respectively, and engage the sides of the connecting rod. The screw 25 passes through the bed plate and engages the under side of the connecting rod in the manner shown in Fig. 3. After the connecting rod has been put in place and centered, the collar 10 is put onto the bolt 6 and clamped in place by the nut 12. The collar 10 has two diametrical openings 28 which connect with the circular groove 11. Several vents 29 are also provided. The molten babbitt is poured through the holes 28 and flows into the space between the sides of the mandrel 4 and the inner surface of the connecting rod bearing.

Where the connecting rod bearing is made in two parts, as is usually the case, the parts are separated by a shim of suitable thickness so that adjustment can be made from time to time as the bearing wears. After the babbitt has hardened and before the connecting rod is removed from the mandrel, the nut 12 is loosened slightly and then the spanner 30 (Fig. 5) is applied to the collar 10 and the latter turned about its center sufficiently to shear the babbitt plugs that extend into the openings 28. After the plugs have been sheared, the connecting rod may be removed.

From the above, it is evident that I have produced a babbitting jig that can be used with connecting rods of various makes, as it has sufficient adjustment to accommodate the shortest and the longest rods in general use. The mandrel 4, stud 5 and collars 8 and 10 are not the same for all makes of connecting rods, but must be made to fit the particular connecting rod worked on.

I desire to call particular attention to the adjusting screws 25, 26 and 27 which are very important and serve to hold the rod in adjusted position while the collar 10 is being put into place and tightened. These adjusting means are new as far as I am aware and are therefore claimed by me as part of my invention. Another important feature of my invention is the adjustable stud 20 which can be moved towards and away from the mandrel 4 and which is of such a diameter that it completely fills the wrist pin opening in the connecting rod. This prevents any wobbling of the rod and assures that it will occupy the proper position with respect to the mandrel 4 which is not always the case where the rod is held by conical-ended clamping screws.

Having now described my invention, what I claim as new is:

A babbitting device comprising a base plate having an opening at one end and an elongated slot near the other end, a mandrel rigidly secured in said opening and extending in a direction at right angles to the plane of the top surface of the base plate, a stud slidably connected to the plate and movable along the slot, the axis of the said stud being parallel with the axis of the mandrel, said stud being adapted to cooperate with a connecting rod having an opening adapted to receive the stud, and another opening adapted to receive the mandrel, said last named opening being larger than the mandrel, a pair of lugs extending upwardly from the upper surface of the base plate, one lug being located on each side of a line joining the axis of the stud and the mandrel, a screw in each of said lugs, said screws being adapted to engage the sides of a connecting rod for the purpose of moving it in a plane parallel to the plane of the upper surface of the base plate, a screw operatively connected to the base plate and adapted to engage the bottom of the connecting rod for adjustment purposes, a collar secured to the mandrel, said collar having a groove in its upper surface, a second collar adapted to be secured to the mandrel near its upper end, and a nut for holding the last named mandrel in place.

In testimony whereof I affix my signature.

WILLIAM M. HOLLOWELL.